US010090670B2

(12) United States Patent
Chen et al.

(10) Patent No.: US 10,090,670 B2
(45) Date of Patent: Oct. 2, 2018

(54) PREVENTION METHOD OF ABNORMAL ACTION PROTECTION OF UHV REGULATING COMPENSATION TRANSFORMER WITH NO-LOAD INPUT

(71) Applicants: XJ GROUP CORPORATION, Xuchang (CN); XJ ELECTRIC CO., LTD, Xuchang (CN); XUCHANG XJ SOFTWARE TECHNOLOGIES LTD, Xuchang (CN); STATE GRID CORPORATION OF CHINA, Beijing (CN)

(72) Inventors: Jirui Chen, Xuchang (CN); Jiansong Zhao, Xuchang (CN); Yun Gong, Xuchang (CN); Maojun Deng, Xuchang (CN); Chuankun Ni, Xuchang (CN); Dongxiao Yao, Xuchang (CN); Heke Ma, Xuchang (CN); Lijuan Lv, Xuchang (CN); Baowei Li, Xuchang (CN); Xu Li, Xuchang (CN); Jidong Huang, Xuchang (CN); Feng Xiao, Xuchang (CN); Shasha Hu, Xuchang (CN); Jingli Zhang, Xuchang (CN); Yingying Xi, Xuchang (CN)

(73) Assignees: XJ GROUP CORPORATION, Xuchang (CN); STATE GRID CORPORATION OF CHINA, Beijing (CN)

( * ) Notice: Subject to any disclaimer, the term of this patent is extended or adjusted under 35 U.S.C. 154(b) by 368 days.

(21) Appl. No.: 15/076,664

(22) Filed: Mar. 22, 2016

(65) Prior Publication Data
US 2017/0018919 A1    Jan. 19, 2017

(51) Int. Cl.
*H02H 3/08*  (2006.01)
*H02H 3/087* (2006.01)
(Continued)

(52) U.S. Cl.
CPC .................................. *H02H 7/045* (2013.01)

(58) Field of Classification Search
CPC ............ H02H 3/08; H02H 3/087; H02H 9/01; H02H 3/10
(Continued)

(56) References Cited

U.S. PATENT DOCUMENTS

2004/0004794 A1*  1/2004  Kang ..................... H02H 7/045
                                                         361/38
2007/0041137 A1*  2/2007  Thompson ............. H02H 7/045
                                                         361/85
(Continued)

*Primary Examiner* — Dharti Patel
(74) *Attorney, Agent, or Firm* — CBM Patent Consulting, LLC

(57) ABSTRACT

The present invention relates to a prevention method of abnormal action protection of UHV regulating compensation transformer with no-load input, the prevention method includes: first determining a value of differential current of regulating compensation transformer, if the value of differential current is smaller than a pre-setting threshold, then, identifying whether an uninterruptible point of differential current waveform meets an pre-setting regulation according to original value of differential current or sampling value of differential difference current, and determining comprehensively whether the regulating compensation transformer is in no-load input or in fault directly with a value of second harmonic content of logic differential current together; if a value of differential current before pre-setting period is larger than the pre-setting threshold, the regulating compensation transformer is diagnosed to have external CT saturation, determining comprehensively whether the regulating compensation transformer is in no-load input or in fault by using result of the uninterruptible point after delaying and the value of second harmonic content of logic difference together, and corresponding inactivating or activating differential protection. By using the value of differential current
(Continued)

before a pre-setting period, characteristics of the original value of differential current and the sampling value of differential difference current, and second harmonic inrush to discriminate an pre-setting regulation, the present invention can avoid the regulating compensation transformer occurring abnormal action when no-load switching transformer of UHV substation is charging, and isolating the fault quickly when the no-load switching transformer is in fault state.

6 Claims, 2 Drawing Sheets

(51) Int. Cl.
  *H02H 9/02* (2006.01)
  *H02H 3/10* (2006.01)
  *H02H 7/045* (2006.01)
(58) Field of Classification Search
  USPC .......................................................... 361/93.1
  See application file for complete search history.

(56) References Cited

U.S. PATENT DOCUMENTS

2011/0063761 A1* 3/2011 Kasztenny ............. H02H 7/045
  361/36
2016/0149390 A1* 5/2016 Donolo .................... H02H 7/06
  322/27

* cited by examiner

PREVENTION METHOD OF ABNORMAL ACTION PROTECTION OF UHV REGULATING COMPENSATION TRANSFORMER WITH NO-LOAD INPUT

FIELD OF THE INVENTION

The present invention relates to an art of relay protection in electric power system, more particularly, relates to a prevention method of abnormal action protection of UHV regulating compensation transformer with no-load input.

DESCRIPTION OF THE RELATED ART

It is required that relay protection device should not be misoperated when the UHV regulating compensation transformer with no-load input is in power. When the UHV regulating compensation transformer with no-load input is in fault state, a device created the fault should be isolated safely, fast and reliablely to ensure the UHV regulating compensation transformer operate safely and stablely.

In the prior art, the usual method of differential protection includes: setting longitudinal differential protection which can reflect all of the scopes and characteristics of the faults to make rapid protection when faults appear; setting quick break protection which can determine the effective of anti CT saturation internal and external of a system of the UHV regulating compensation transformer to make rapid and accurate determine whether the system is fault or not and activate the protection.

But now, the capacity of the UHV regulating compensation transformer is small, a interturn fault is a main fault, a intermission angle of waveform of UHV with no-load input is sometimes smaller, the ratio of second harmonic of differential current of one phase is often less than 15%, and abnormal action protection is easy to be caused by the conventional internal and external criterion of anti-saturation and harmonic criterion.

SUMMARY OF THE INVENTION

The purpose of the present invention is to provide a prevention method of abnormal action protection of UHV regulating compensation transformer with no-load input, the prevention method can avoid the UHV regulating compensation transformer occurring abnormal action when the UHV regulating compensation transformer is in no-load input state.

The present invention provides a prevention method of abnormal action protection of UHV regulating compensation transformer with no-load input to solve the above technical problem, the prevention method includes the steps of:

1). calculating an effective value of differential current for regulating compensation transformer before a pre-setting period, then determining whether the effective value is larger than a pre-setting threshold, if the effective value is smaller than the pre-setting threshold, the regulating compensation transformer is diagnosed to have internal fault, if the effective value is larger than the pre-setting threshold, the regulating compensation transformer is diagnosed to have external CT saturation;

2). if the regulating compensation transformer being diagnosed to have internal fault, determining whether an uninterruptible point meets an pre-setting regulation according to characteristics of original sampling value of the differential current and/or sampling value of differential difference current directly, if the regulating compensation transformer being diagnosed to have external CT saturation, determining whether the uninterruptible point meets the pre-setting regulation after a pre-setting period;

3). determining whether the regulating compensation transformer is in no-load input state according to the ratio of second harmonic to fundamental wave of the differential current;

4). if the uninterruptible point meets the pre-setting regulation and the regulating compensation transformer being in no-load input state, activating differential protection, otherwise inactivating the differential protection.

Preferably, the effective value in the step 1) is determined by using a discrimination formula, the discrimination formula is:

$$I_{dNT} > 0.2 * I_e$$

wherein $I_{dNT}$ is an effective value of differential current before an N*T period, T is a sampling period, N is an natural number, and $I_e$ is a base current value of differential protection for the regulating compensation transformer.

Preferably, the uninterruptible point according to characteristics of original sampling value of the differential current in the step 2) is determined by using a discrimination formula, the discrimination formula is:

$$\begin{cases} |I_d(k)| > 0.2 * I_d\max \\ 1 \le k \le N \text{ and } m_1 \ge n_1 \end{cases} \quad \text{formula (1)}$$

$$\begin{cases} |I_d(k)| > 0.5 * I_d\max \\ 1 \le k \le N \text{ and } m_2 \ge n_2 \end{cases} \quad \text{formula (2)}$$

wherein $I_d(k)$ is a sampling value of point difference in one period, $I_d\max$ is a maximum sampling value of point difference in one period, $m_1$ is an uninterruptible point which meets the formula (1), $m_2$ is an uninterruptible point which meets the formula (2), k is a sampling point number in one period, N is a sampling number in one period, $n_1$ is a threshold value of sampling point for the formula (1), $n_2$ is a threshold value of sampling point for the formula (2), and $n_1$ and $n_2$ take the integer portions of $$\frac{19}{24} * N \text{ and } \frac{13}{24} * N$$

respectively;

Otherwise, using a discrimination formula to determine the uninterruptible point according to characteristics of the sampling value of differential difference current in step 2), the discrimination formula is:

$$\begin{cases} |I_{dd}(k)| > 0.2 * I_{dd}\max \\ 1 \le k \le N \text{ and } m_3 \ge n_3 \end{cases} \quad \text{formula (3)}$$

wherein $I_{dd}(k)$ is a sampling value of dfferential point difference in one period, $I_{dd}\max$ is a dfferential maximum point difference sampling value in one period, $m_3$ is an uninterruptible point which meets the formula (3), k is a sampling point number after differentiated in one period, N is a sampling number in one period, $n_3$ is a threshold value of sampling point for the formula (3), and $n_3$ takes the integer portion of $$\frac{5}{6} * N.$$

Preferably, whether the regulating compensation transformer is in no-load input state according to the ratio of second harmonic to fundamental wave of the differential current in the step 3) is determined by using a discrimination formula, the discrimination formula is:

$$I_{d2} > K * I_{d1}.$$

wherein $I_{d1}$ is an effective value of fundamental wave of differential current, $I_d$ is an effective value of second harmonic of differential current, K is a blocking coefficient of second harmonic.

Preferably, the pre-setting period in the step 2) is 30 ms.

Preferably, if an effective value of any phase in the step 1) is smallerthan 0.05 times reference side rated current of the regulating compensation transformer, whether a uninterruptible point of the phase in the step 2) meets the pre-setting regulation or not is not determined, then differential protection of the phase is inactivated directly.

The advantages of the present invention are as follows:

The prevention method of abnormal action protection of UHV regulating compensation transformer with no-load input of the present invention calculates the value of differential current before a pre-setting period, if the value of differential current is smaller than the pre-setting threshold, the regulating compensation transformer is diagnosed to have internal fault, by analyzing characteristics of the original value of differential current and the sampling value of differential difference current, the prevention method of abnormal action protection discriminates whether the uninterruptible point of differential current waveform meets the pre-setting regulation and synthetically judges whether the regulating compensation transformer is in no-load or in fault state directly with the value of second harmonic content of logic difference together. If the value of difference current before a 2T period is larger than the pre-setting threshold, the regulating compensation transformer is diagnosed to have external CT saturation, the prevention method of abnormal action protection uses result of the uninterruptible point fixed after 30 ms delay and the value of second harmonic of logic difference content together to synthetically judge whether the regulating compensation transformer is in no-load or in fault state, and the prevention method of abnormal action protection activates or inactivates the differential protection correspondingly according to the result of judgment. By using the value of differential current before a pre-setting period, charactetistics of the original value of differential current rent and the sampling Talue of differential difference current, and second harmonic inrush to discriminate an pre-setting regulation, the present invention can avoid the regulating compensation transformer occurring abnormal action when no-load switching transformer of UHV substation is charging, and isolating the fault quickly when the no-load switching transformer is in fault state.

DETAILED DESCRIPTION OF THE PREFERRED EMBODIMENT

Combined with the appended drawings, the preferred embodiment of the present invention will be described in detail below.

Figure 1:
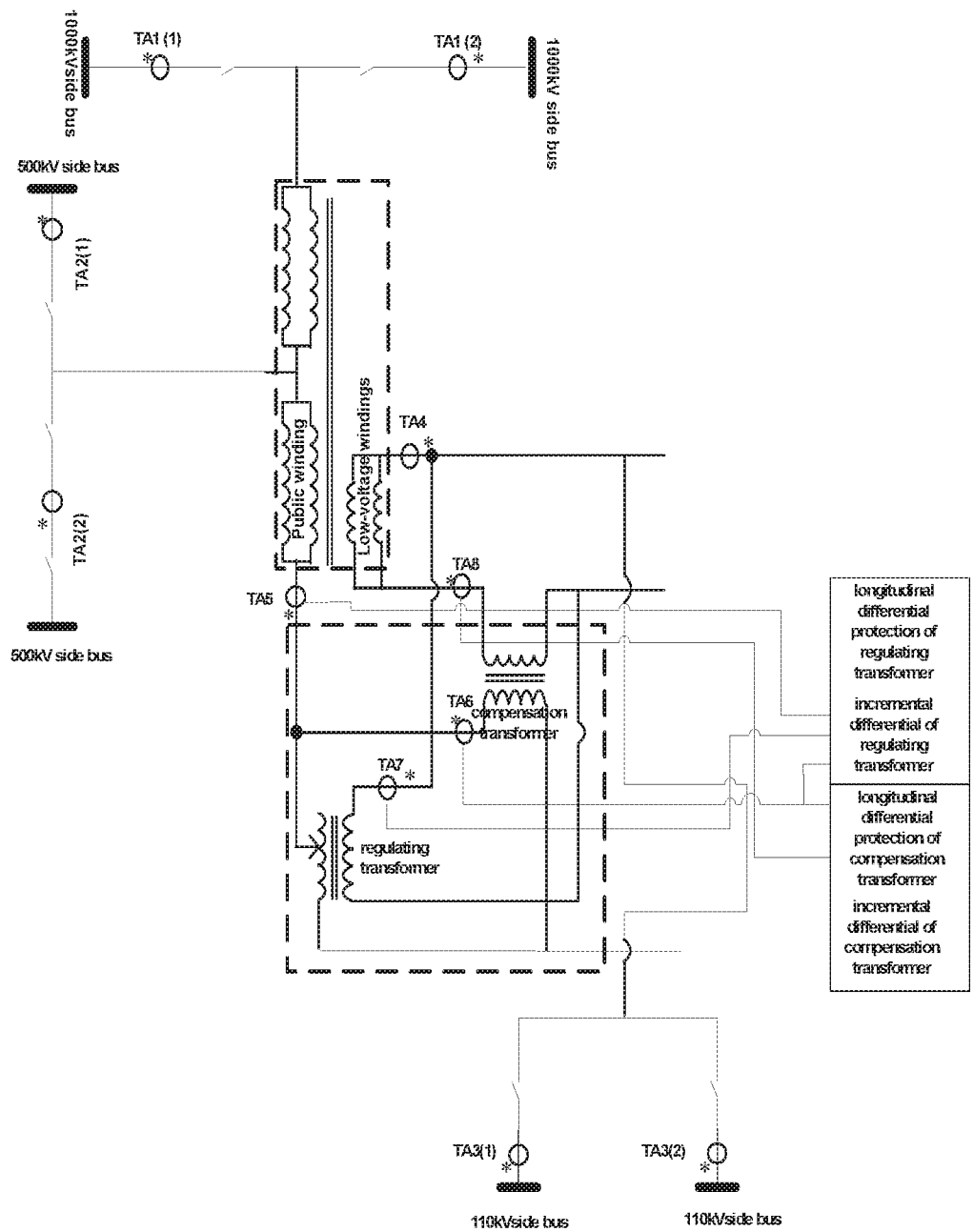
FIG. 1 is a CT distribution map of differential protection for the UHV regulating compensation transformer.
Figure 2:
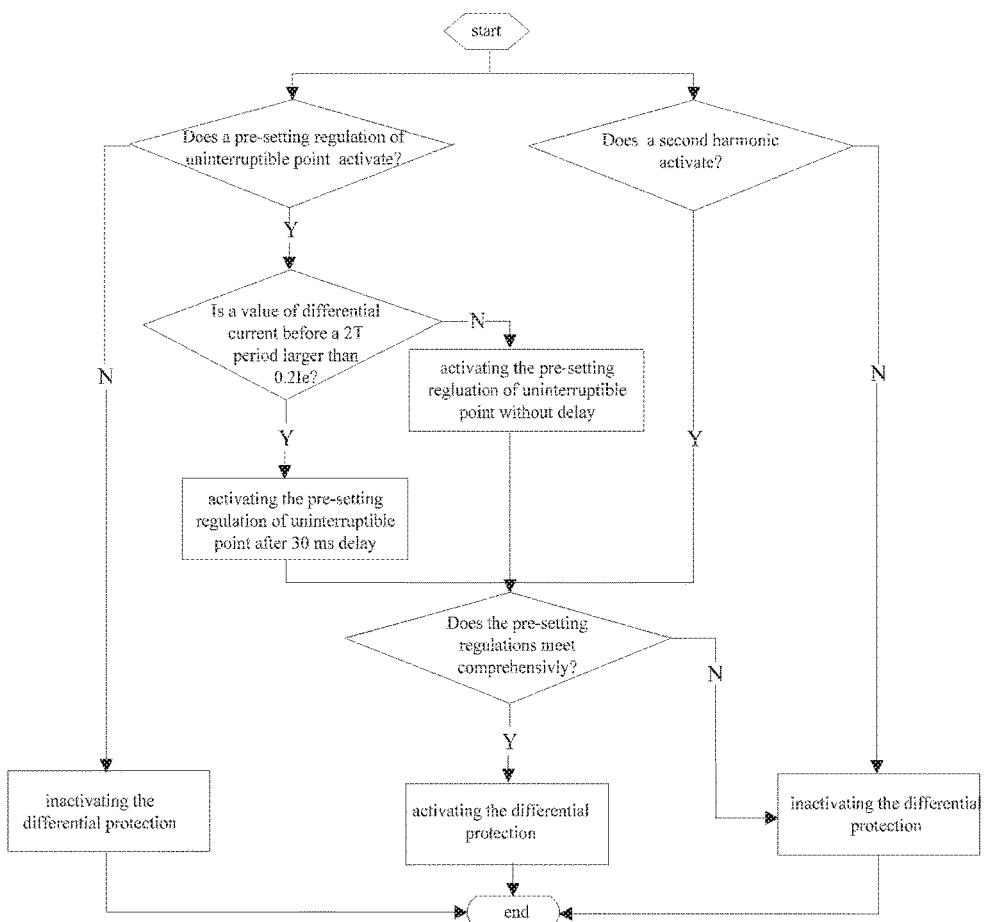
FIG. 2 is a flow chart used in the prevention method of abnormal action protection of UHV regulating compensation transformer with no-load input.
Figure 3:
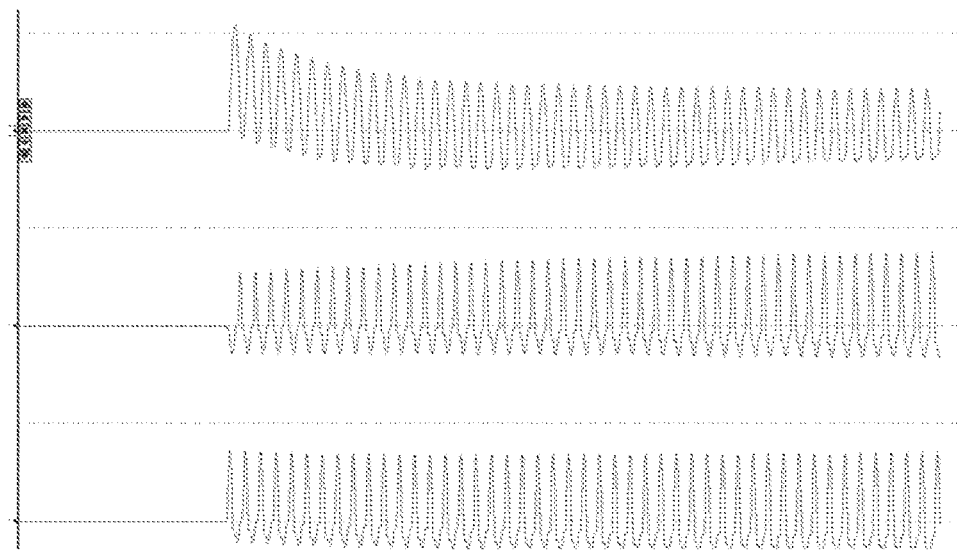
FIG. 3 is a diagram of abnormal action waveform of TAW with no-load input in a field test.

According to the pre-setting regulation to determine whether the UHV regulating compensation transformer is in fault state and characteristics of quick break protection, the present invention provides the prevention method of abnormal action protection of UHV regulating compensation transformer with no-load input, the prevention method of abnormal action protection is mainly used in regular sampling and high voltage relay protection device, the prevention method can be used as an independent function module and integrated in differential protection of the UTIV regulating compensation transformer. Using the uninterruptible point of differential current, second harmonic restraint of differential current, and the value of differential current before pre-setting period to fix activate or inactivate the differential protection, the prevention method of abnormal action protection ensures the differential protection not occur abnormal action when the UHV transformer is in no-load input state, and improves the reliability of protection action by fixing discrimination of the uninterruptible point when the regulating compensation transformer occurs fault. The prevention method is illustrated by differential protection of regulating compensation transformer as an example. In the example, differential protection current of the regulating compensation transformer is CT benchmark side of the regulating compensation transformer, as shown in FIG. 1 of TA6 and TA7. The flow of the prevention method of abnormal action protection of UHV regulating compensation transformer with no-load input is shown in FIG. 2. Concrete implementation steps are consists of:

1. calculating effective values of three-phase current of A, B and C of differential current before a pre-setting period which is two periods in the example, determining whether the effective value of differential current before 2T period is larger than the threshold calculation by using a discrimination formula, the discrimination formula is:

$$I_{d2T} > 0.2 * I_e$$

$I_{d2T}$ is an effective value of any phase current of A, B, C of differential current before 2T period, $I_e$ is a base current value of differential protection for the regulating compensation transformer.

If one phase current of differential current before 2T period is smaller than the pre-setting threshold, the regulating compensation transformer is diagnosed to have internal fault, and character of fault wave is need to be further identified to improve reliability of protection operation. If one phase current of differential current before a 2T period is larger than the pre-setting threshold, the regulating compensation transformer is diagnosed to have internal CT saturation, and it can effectively escape CT transient saturation and avoid abnormal action protection by delaying the pre-setting period, in the example, the pre-setting period is 30 ms.

2. synthesising waveform of sampling values of the differential protection, a computation formula of the differential current is as follows:

$$I_d(k)=i_1(k)+i_2(k)+i_3(k)+ \ldots +i_n(k)$$

$I_d(k)$ is a current sampling value of differential current, $i_1(k)$, $i_2(k)$, $i_3(k)$ and $i_n(k)$ is current sampling value of every side of reference side which is converted by the regulating compensation transformer.

3. analyzing original value of differential current in one period, comparing rate relations of each sampling point of original differential current to maximum value, and calculating the uninterruptible point by using a discrimination formula, the discrimination formula is:

$$\begin{cases} |I_d(k)| > 0.2 * I_d \max \\ 1 \le k \le N \text{ and } m_1 \ge n_1 \end{cases} \quad \text{formula (1)}$$

$$\begin{cases} |I_d(k)| > 0.5 * I_d \max \\ 1 \le k \le N \text{ and } m_2 \ge n_2 \end{cases} \quad \text{formula (2)}$$

wherein $I_d(k)$ is a point difference sampling value in one period, $I_d$max is a maximum point difference sampling value in one period, $m_1$ is a uninterruptible point which meets the formula (1), $m_2$ is a uninterruptible point which meets the formula (2), k is a sampling point number in one period, N is a sampling number in one period, $n_1$ is a threshold value of sampling point for the formula (1), $n_2$ is a threshold of sampling points for the formula (2), and $n_1$ and $n_2$ take the integer portions of $$\frac{19}{24}*N \text{ and } \frac{13}{24}*N,$$

respectively.

4. performing the differential for the current differential current to obtain sampling value of differential current after differentiated, and comparing rate relations of each sampling point of differential current to maximum value after differentiated, calculating the uninterruptible point by using a discrimination formula, the discrimination formula is:

$$\begin{cases} |I_{dd}(k)| > 0.2 * I_{dd} \max \\ 1 \le k \le N \text{ and } m_3 \ge n_3 \end{cases} \quad \text{formula (3)}$$

$I_{dd}(k)$ is a sampling value of dfferential point difference in one period, $I_{dd}$ max is a dfferential maximum point difference sampling value in one period, $m_3$ is a uninterruptible point which meets the formula (3), k is a sampling point number of every period after differentiated, N is a sampling number in one period, $n_3$ is a threshold of sampling point for the formula (3), and $n_3$ takes the integer part of $$\frac{5}{6}*N.$$

5. calculating rate relations of the second harmonic to fundamental wave of differential current, determining whether the regulating compensation transformer is in no-load input state by using a discrimination formula, the discrimination formula is:

$$I_{d2} > K*I_{d1} \quad (4)$$

$I_{d1}$ an effective value of fundamental wave of differential current, $I_{d2}$ is an effective value of second harmonic of differential current, K is a blocking coefficient of second harmonic, generally, the K is 0.15.

6. identifying a period continuously, take 24 sampling points as an example, if the regulating compensation transformer meets action conditions of the step 3 and the step 5 or step 4 and step 5, the differential protection should be activated; if the regulating compensation transformer does not meet any action condition of the step 3 and the step 5 or step 4 and step 5, the differential protection should be inactivated.

If one phase current of differential current before a 2T period is smaller than the pre-setting threshold, the regulating compensation transformer is diagnosed to have internal fault, the step 3, the step 4 and the step 5 is discriminated to further confirm the characteristics of the fault waveform which can improve reliability of protection operation. If one phase current of differential current before a 2T period is larger than the pre-setting threshold, the regulating compensation transformer is diagnosed to have external CT saturation, it can effectively escape the CT transient saturation and avoid abnormal action protection by 30 ms delay.

When the regulating compensation transformer is in no-load input state, the differential protection is activated or inactivated by phase in the step 3, the 4 and the 5. If differential current of any phase of A, B, and C is less than $0.05I_e$, the uninterruptible point of corresponding phase of the step 3 and step 4 are not to be identified, the differential protection is directly inactivated to reduce probability of data mishandling protection.

By using the value of differential current before pre-setting period, characteristics of the original value of differential current and the sampling value of differential difference current, and second harmonic inrush to discriminate an pre-setting regulation, the present invention can avoid the regulating compensation transformer occurring abnormal action when no-load switching transformer of UHV substation is charging, and quickly isolating fault when the no-load switching transformer is in fault state.

What is claimed is:

1. A prevention method of abnormal action protection of UHV regulating compensation transformer with no-load input, being characterized in that the prevention method includes the steps of:
   1). calculating an effective value of differential current for UHV regulating compensation transformer before a pre-setting period, then determining whether the effective value is larger than a pre-setting threshold, if the effective value is smaller than the pre-setting threshold, the UHV regulating compensation transformer is diagnosed to have internal fault, if the effective value is larger than the pre-setting threshold, the UHV regulating compensation transformer is diagnosed to have external CT saturation;
   2). if the UHV regulating compensation transformer being diagnosed to have internal fault, determining whether an uninterruptible point meets an pre-setting regulation according to characteristics of original sampling value of the differential current and/or sampling value of differential difference current directly, if the UHV regulating compensation transformer being diagnosed to have external CT saturation, determining whether the uninterruptible point meets the pre-setting regulation after a pre-setting period;

3). determining whether the UHV regulating compensation transformer is in no-load input state according to the ratio of second harmonic to fundamental wave of the differential current;

4). if the uninterruptible point meets the pre-setting regulation and the UHV regulating compensation transformer being in no-load input state, activating differential protection, otherwise inactivating the differential protection.

2. The prevention method of abnormal action protection of UHV regulating compensation transformer with no-load input of claim 1, being characterized in that using a discrimination formula to determine the effective value in the step 1), the discrimination formula is:

$$I_{dNT} > 0.2 * I_e$$

wherein $I_{dNT}$ is an effective value of differential current before an N*T period, T is a sampling period, N is an natural number, and $I_e$ is a base current value of differential protection for the UHV regulating compensation transformer.

3. The prevention method of abnormal action protection of UHV regulating compensation transformer with no-load input of claim 2, being characterized in that using a discrimination formula to determine the uninterruptible point according to characteristics of original sampling value of the differential current in the step 2), the discrimination formula is:

$$\begin{cases} |I_d(k)| > 0.2 * I_d \max \\ 1 \le k \le N \text{ and } m_1 \ge n_1 \end{cases} \quad \text{formula (1)}$$

$$\begin{cases} |I_d(k)| > 0.5 * I_d \max \\ 1 \le k \le N \text{ and } m_2 \ge n_2 \end{cases} \quad \text{formula (2)}$$

wherein $I_d(k)$ is a sampling value of point difference in one period, $I_d\max$ is a maximum sampling value of point difference in one period, $m_1$ is an uninterruptible point which meets the formula (1), $m_2$ is an uninterruptible point which meets the formula (2), k is a sampling point number in one period, N is a sampling number in one period, $n_1$ is a threshold value of sampling point for the formula (1), $n_2$ is a threshold value of sampling point for the formula (2), and $n_1$ and $n_2$ take the integer portions of $$\frac{19}{24} * N \text{ and } \frac{13}{24} * N$$

respectively;

Otherwise, using a discrimination formula to determine the uninterruptible point according to characteristics of the sampling value of differential difference current in step 2), the discrimination formula is:

$$\begin{cases} |I_{dd}(k)| > 0.2 * I_{dd} \max \\ 1 \le k \le N \text{ and } m_3 \ge n_3 \end{cases} \quad \text{formula (3)}$$

wherein $I_{dd}(k)$ is a sampling value of dfferential point difference in one period, $I_{dd}\max$ is a dfferential maximum point difference sampling value in one period, $m_3$ is an uninterruptible point which meets the formula (3), k is a sampling point number after differentiated in one period, N is a sampling number in one period, $n_3$ is a threshold value of sampling point for the formula (3), and $n_3$ takes the integer portion of $$\frac{5}{6} * N.$$

4. The prevention method of abnormal action protection of UHV regulating compensation transformer with no-load input of claim 3, being characterized in that using a discrimination formula to determine whether the UHV regulating compensation transformer is in no-load input state according to the ratio of second harmonic to fundamental wave of the differential current in the step 3), the discrimination formula is:

$$I_{d2} > K * I_{d1}.$$

wherein $I_{d1}$ is an effective value of fundamental wave of differential current, $I_{d2}$ is an effective value of second harmonic of differential current, K is a blocking coefficient of second harmonic.

5. The prevention method of abnormal action protection of UHV regulating compensation transformer with no-load input of claim 4, being characterized in that the pre-setting period in the step 2) is 30 ms.

6. The prevention method of abnormal action protection of UHV regulating compensation transformer with no-load input of claim 4, being characterized in that if an effective value of any phase in the step 1) is smaller than 0.05 times reference side rated current of the UHV regulating compensation transformer, whether a uninterruptible point of the phase in the step 2) meets the pre-setting regulation or not is not determined, then differential protection of the phase is inactivated directly.

* * * * *